US012007337B2

(12) United States Patent
Chenneviere et al.

(10) Patent No.: US 12,007,337 B2
(45) Date of Patent: Jun. 11, 2024

(54) SYSTEM AND METHOD FOR DETECTING GLASS-CERAMIC MATERIAL

(71) Applicants: SAINT-GOBAIN ISOVER, Courbevoie (FR); VERALLIA PACKAGING, Courbevoie (FR)

(72) Inventors: Hugues Chenneviere, Colombes (FR); Ezzeddine Ouerghemmi, Antony (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 302 days.

(21) Appl. No.: 17/601,853

(22) PCT Filed: Apr. 9, 2020

(86) PCT No.: PCT/EP2020/060229
§ 371 (c)(1),
(2) Date: Oct. 6, 2021

(87) PCT Pub. No.: WO2020/212263
PCT Pub. Date: Oct. 22, 2020

(65) Prior Publication Data
US 2022/0187217 A1 Jun. 16, 2022

(30) Foreign Application Priority Data

Apr. 19, 2019 (FR) ...................................... 1904246

(51) Int. Cl.
*G01N 21/958* (2006.01)
*G01N 21/88* (2006.01)
(52) U.S. Cl.
CPC ....... *G01N 21/958* (2013.01); *G01N 21/8806* (2013.01); *G01N 21/8851* (2013.01);
(Continued)

(58) Field of Classification Search
CPC ............. G01N 21/958; G01N 21/8806; G01N 21/8851; G01N 2021/8845;
(Continued)

(56) References Cited

U.S. PATENT DOCUMENTS

2007/0029233 A1  2/2007  Huber et al.
2007/0187305 A1  8/2007  Valerio et al.
(Continued)

FOREIGN PATENT DOCUMENTS

EP    2801816 A2 * 11/2014   ....... G01N 21/95607
FR    3010790 A1 *  3/2015   ............ B07C 5/342
(Continued)

OTHER PUBLICATIONS

English translation of EP2801816, published Nov. 12, 2014. (Year: 2014).*

(Continued)

*Primary Examiner* — Christina A Riddle
(74) *Attorney, Agent, or Firm* — Pillsbury Winthrop Shaw Pittman LLP

(57) ABSTRACT

An automated system for detecting glass-ceramic materials among a cullet, includes at least one white light source and at least one monochromatic ultraviolet light source, each being oriented to emit in the same emission region. The system includes an image acquisition device configured to acquire an image of the emission region and an image processing device configured to process each of the images acquired by the image acquisition device, the image processing device including a colorimetric image processing module configured to ensure the detection of the glass-ceramic material among other types of glass.

15 Claims, 4 Drawing Sheets

(52) U.S. Cl.
CPC .............. *G01N 2021/8845* (2013.01); *G01N 2021/8887* (2013.01)

(58) Field of Classification Search
CPC .......... G01N 2021/8887; G01N 21/33; G01N 2021/335; G01N 2021/3185; G01N 2021/3188; G01N 21/314; G01N 21/3151; G01N 2021/3155; G01N 2021/3166; G01N 2021/3181; G01N 21/251; G01N 21/25; G01N 21/255; G01N 21/256; B07C 5/3422; G06T 2207/10024; G06T 7/90; G01J 3/00; G01J 3/06; G01J 3/10; G01J 3/12; G01J 3/28; G01J 3/2803; G01J 3/2823; G01J 3/46; G01J 3/462; G01J 3/463; G01J 3/50–502; G01J 3/51; G01J 2003/003; G01J 2003/006; G01J 3/0259; G01J 2003/104; G01J 2003/106; G01J 3/0275; G01J 2003/1265; G01J 2003/1282; G01J 2003/2806; G01J 2003/2813; G01J 2003/2816; G01J 2003/282; G01J 2003/2826; G01J 2003/2833; G01J 2003/2836; G01J 2003/284; G01J 2003/2843; G01J 3/457; G01J 2003/466; G01J 2003/467; G01J 2003/503; G01J 2003/507; G01J 3/0224; G01J 3/021; G01J 3/0202; G01J 3/0262; G01J 3/0267; G01J 3/0297; G01J 2003/102; G01J 3/501

USPC ................ 356/402–425, 432–444, 445–448, 356/237.1–237.6, 51; 209/576, 577, 578, 209/580, 582, 581, 587, 588
See application file for complete search history.

(56) References Cited

U.S. PATENT DOCUMENTS

| | | | |
|---|---|---|---|
| 2008/0291439 A1* | 11/2008 | Sones | ................. G01N 21/909 356/240.1 |
| 2010/0103407 A1* | 4/2010 | Imura | .................... G01N 21/25 356/73 |
| 2022/0023917 A1* | 1/2022 | Van Rijckevorsel | ... B07C 5/342 |

FOREIGN PATENT DOCUMENTS

| | | |
|---|---|---|
| JP | 2001-269629 A | 10/2001 |
| WO | WO 2011/020628 A1 | 2/2011 |
| WO | WO 2018/096943 A1 | 5/2018 |

OTHER PUBLICATIONS

English translation of FR3010790, published Mar. 20, 2015. (Year: 2015).*

English translation of WO2018/096943, published May 31, 2018. (Year: 2018).*

International Search Report as issued in International Patent Application No. PCT/EP2020/060229, dated Aug. 4, 2020.

* cited by examiner

FIG. 1

SYSTEM AND METHOD FOR DETECTING GLASS-CERAMIC MATERIAL

CROSS-REFERENCE TO RELATED APPLICATIONS

This application is the U.S. National Stage of PCT/EP2020/060229, filed Apr. 9, 2020, which in turn claims priority to French patent application number 1904246 filed Apr. 19, 2019. The content of these applications are incorporated herein by reference in their entireties.

FIELD

The present invention relates to an automated system for detecting materials of the glass-ceramic type among a sample of fragments of glass, or cullet. The invention relates to the field of the industry of manufacturing glass-based products.

BACKGROUND

Samples of glass fragments, or cullet, are used to manufacture various glass products. For example, in the field of insulation, glass fibers are commonly used, obtained largely from cullet. Cullet can also be used in the manufacture of bottles and other glass containers.

The manufacture of fiberglass takes place according to a method consisting first of all in heating the cullet, in a glass furnace, to a temperature sufficient to melt the glass, i.e. about 1500° C. The molten glass is then conducted into a centrifugation device of the fiberizing plate type, resulting in the creation of fibers that are sized on their passage to a conveyor on which they are then dried, cured and shaped.

Due to user sorting errors, the cullet may contain not only glass, but also other materials, including glass-ceramic materials. These glass-ceramic materials, which have properties different from those of glass, can cause significant problems in the manufacturing methods of cullet-based products by damaging the machines and/or by causing defects in the products.

By way of example, in the manufacture of glass fibers as presented above, the glass-ceramic materials, which have a melting point of about 1700° C., are not melted in the glass furnace, in which the glass is melted at 1500° C. When, to obtain glass fibers, the molten material leaving the furnace is introduced into an internal centrifugation device of the fiberizing plate type, the pieces of glass-ceramic material contained in the molten glass block the holes in the fiberizing plate, the diameter of which may in particular be less than 1 mm. The entire production chain must then be stopped.

When manufacturing bottles and containers based on cullet, the pieces of glass-ceramic material present in the cullet can cause local fragilities on the obtained products and/or esthetic problems.

It follows from the above that there is a need for analysis of the cullet in order to be able to precisely identify the glass-ceramic material among all the pieces, prior to any operation to remove this glass-ceramic material from the cullet.

Different methods are known for sorting the cullet, each of which has one or more drawbacks.

One prior art consists in carrying out the analysis of the cullet by spectrometry. However, the equipment needed to perform spectrometric analyses is expensive and cumbersome. Moreover, this type of analysis does not make it possible to detect transparent glass-ceramic materials.

Another prior art consists in irradiating a cullet with an ultraviolet light source and a light source in the visible range, then in analyzing the correspondences between the two obtained images by the shading method. In other words, one camera analyzes whether the image of the cullet illuminated by visible light is dark or light, that is to say, whether the cullet has passed visible light, and another camera analyzes whether the image of the cullet illuminated by ultraviolet light is dark or light, that is to say, whether or not the cullet has interrupted these ultraviolet rays. Depending on the result of each of these tests, the device makes it possible to classify the type of cullet analyzed. It should be noted that this method is not specifically suitable for glass-ceramic materials, in that it can consider fragments of colored and/or dirty glass to be glass-ceramic materials. In addition, this method requires several image acquisition devices, which can prove to be expensive and/or cumbersome.

There are also X-ray detection methods, but these methods require very significant safety measures to be taken because of the permanent risks of irradiation.

SUMMARY

The present invention makes it possible to overcome these problems due to the presence of glass-ceramic materials in the cullet, in a specific manner, by limiting production costs, and without endangering the health of others.

It consists of an automated system for detecting materials of the glass-ceramic type among a cullet, comprising at least one white light source, at least one monochromatic ultraviolet light source, each being oriented to emit in the same emission region, the system further comprising an image acquisition device configured to acquire an image of said emission area and an image processing device configured to process each of the images acquired by the image acquisition device, the image processing device comprising a colorimetric image processing module configured to provide the detection of glass-ceramic materials among other types of glass.

To detect glass-ceramic materials, two light sources are used. The monochromatic ultraviolet light source is at least one light-emitting diode (LED) emitting ultraviolet rays at a wavelength of about 365 nm. Glass-ceramic material has the particularity of interrupting ultraviolet rays, while the vast majority of other types of glass allow these same rays to pass through, which therefore pass through their structure. More particularly, for a range of wavelengths from 355 nm to 365 nm, the glass-ceramic material has the particularity of interrupting the majority of the ultraviolet rays. This difference in properties is explained by the presence of metal oxides in the glass-ceramic material, in particular titanium dioxide $TiO_2$, which have the particularity of absorbing ultraviolet rays. The difference in optical properties in the ultraviolet range between glass-ceramic material and other types of glass is therefore a determining factor for the specific detection of glass-ceramic material.

The white light source is polychromatic, that is to say, unlike the monochromatic ultraviolet light source, the white light source emits light radiation combining a multitude of wavelengths. White light emits in the visible region, with a wavelength range of between about 400 and 800 nm. White light passes through all types of transparent glass, including glass-ceramic material.

The light sources are oriented to emit light radiation in the same emission region. It is the combination of light radiation that makes it possible to optically distinguish glass-ceramic material from other types of glass among a cullet.

The image acquisition device is advantageously a CCD-type camera, commonly used in digital imaging. The image acquisition device captures the light rays coming from the light sources, as described below.

The image processing device is an algorithm processing the shots taken by the image acquisition device. The image processing device comprises a colorimetric image processing module. The term "colorimetric processing" refers to all types of processing modules making it possible to obtain a correspondence of the shades of color appearing in an acquired image in numbered or lettered data.

According to one feature of the invention, the colorimetric image processing module processes the images obtained by the image acquisition device by considering only one datum of a three-data colorimetric model. Among the colorimetric models, most consist in converting a shade of color into a trio of data allowing each of the colors of a predefined color spectrum to be defined. The particularity of the invention is that it has the ability to detect shades of color from a single datum of the data trio. The analysis carried out by the invention therefore ensures a better performance in the event of potential chain detection, for example.

According to one feature of the invention, the colorimetric image processing module is a colorimetric image processing module according to an HSV model and processes the images obtained by the image acquisition device only by considering the data H of the HSV model.

The HSV color space, in French TSV, is an acronym meaning Hue Saturation Value. Each datum of these three terms makes it possible to define any shade of color in the visible domain.

"Hue" is a term that can be represented by a circle and is defined by a data range from 0 to 360°. Each degree represents a hue, according to the following table:

| Degree | Hue |
| --- | --- |
| 0° | Red |
| 60° | Yellow |
| 120° | Green |
| 180° | Cyan |
| 240° | Blue |
| 300° | Magenta |
| 360° | Red |

"Saturation" is a term between 0 and 1, reflecting the notion of amount of color. A saturation approaching 0 will tend to be less intense, while a saturation approaching 1 will be more saturated.

"Value" is also a term between 0 and 1, reflecting the notion of shine or luminance. Any datum with a value equal to 0 is associated with a black color. The closer the value is to 1, the lighter the associated color will be.

All the different HSV data can be represented by a cone of revolution, within which all the shades of visible color can be converted into HSV terms and all correspond to a point on the area of this cone of revolution. Hue is the circumference of the cone, Saturation is the radius of the cone, and Value is the height of the cone.

The colorimetric image processing module according to an HSV model processes the images obtained by the image acquisition device by considering only one datum of the HSV model, and more particularly only the datum H of this HSV model. As mentioned previously, the HSV model corresponds to a set of three data. Nevertheless, the inventors have demonstrated by various tests that only the Hue H is a datum of interest during the analysis of the cullet by the present detection system. This allows the detection system to be configured so as to only calculate the datum for the Hue H of the HSV model, and therefore to calculate only one datum instead of three, thus increasing the execution speed and therefore the efficiency of the system.

According to one feature of the invention, the emission region comprises a reflective surface, on which the cullet is placed and which is illuminated by the two types of light sources simultaneously. The light rays emitted simultaneously are picked up by the image acquisition device placed on the same side of the reflective surface as the light sources.

The light sources project their radiation simultaneously onto the cullet when the latter is located at the emission region of the light sources. The latter is therefore illuminated by ultraviolet rays and white light rays. It is this simultaneous radiation that allows the detection system to distinguish glass-ceramic material from other types of glass.

When the light sources project their radiation simultaneously, the cullet is both in the emission region of the light sources and in the capture plane of the image acquisition device. The reflective surface reflects the rays that it receives, emitted by the light sources, so as to direct these light rays toward the image acquisition device. This arrangement makes it possible to place the light sources and the image acquisition device on the same side of the reflective surface and therefore to limit the mechanical bulk of the system.

According to one feature of the invention, the radiation from the monochromatic ultraviolet light source passes through a band-pass filter centered on a wavelength of 365 nm. This bandpass filter thus only allows light radiation with a wavelength of a value equal to 365 nm to pass. Although the monochromatic ultraviolet light source theoretically diffuses only at 365 nm, it is possible that it emits spurious ultraviolet rays that can distort the processing of the image subsequently obtained. The low band filter makes it possible to eliminate these spurious rays coming from the monochromatic ultraviolet light source and not having a value of 365 nm, in order to ensure purely monochromatic light radiation. More generally, the bandpass filter centered on a wavelength of 365 nm also ensures monochromatic radiation in the event that the UV source emits in a wavelength range and is not a basic monochromatic light source.

According to one feature of the invention, the light waves emitted by at least the white light source are processed by a crossed polarizer and analyzer assembly before being picked up by the image acquisition device.

If the white light source has too high a brightness, the image acquisition device will perform captures with spurious "noise." This "noise" corresponds to light reflections of an intensity such that the obtained image is difficult to analyze because certain reflections that are too bright risk obscuring some of the fragments of the cullet due to their luminance.

To overcome this "noise" problem, a polarizer and analyzer device is installed within the system. The polarizer is placed in front of the white light source, while the analyzer is placed in front of the lens of the image acquisition device.

According to one feature of the invention, the detection system comprises a conveyor intended to make the cullet pass through the emission region of the light sources.

Although the cullet can be analyzed statically, it is conceivable to implement an embodiment comprising a conveyor within the system, with a reflecting mat or else with cullets each scrolling on their own reflective surface, so that the cullets are analyzed in turn as they pass through the emission region of the light sources and the capture plane of the image acquisition device. To this end, the light sources and the image acquisition device must be arranged so that the emission region and the capture plane coincide with the path of the conveyor. This embodiment makes it possible to integrate the detection of glass-ceramic material into the process of manufacturing cullet-based products, and this makes it possible to facilitate the removal of the glass-ceramic material if it is detected as such.

According to one feature of the invention, the system comprises a calculation module configured to determine the position of the various fragments of the cullet during its movement. In other words, if the embodiment involving the automated movement of the cullet is implemented, the detection system comprises a calculation module capable of giving a position of the various fragments of the cullet in real time during the movement downstream of the emission region and of the capture plane. This calculation module takes into account in particular the scrolling speed of the cullet, so that each fragment is tracked and recognized as such as the cullet moves. This calculation module is therefore used to record the position of the fragments of the cullet detected as being fragments of glass-ceramic material at each instant t at the emission region, and to estimate their position downstream at an instant t+Δt by taking into account the movement speed of the cullet on the conveyor, in particular in order to send the information to a device for removing glass-ceramic fragments, external to the system, so that it expels the desired fragment(s) of the cullet by turning on in the right place at the right time.

According to one feature of the invention, and in a manner complementary to what has been described above, the colorimetric processing device can further comprise a colorimetric image processing module according to an RGB model. The RGB model is a color definition model, different from the HSV model. Like the HSV model, the RGB model is based on the value of three data defining each of the shades of color in the visible domain. Each color is defined according to the value of each of the three primary colors used to define this color, namely the red R, the green G and the blue B. Each of the RGB values is between 0 and 255.

This colorimetric image processing module according to an RGB model can be included in the detection system to check the results of the HSV model colorimetric image processing module and to ensure better detection accuracy of the system.

According to one feature of the invention, the RGB model colorimetric image processing module can convert the entire image obtained by the image acquisition device to RGB data. However, advantageously, the system can be configured so that the colorimetric image processing module according to an RGB model converts into RGB data only the pixels of the acquired image that correspond to the fragments detected as being fragments of glass-ceramic material after analysis of the image by the colorimetric image processing module according to an HSV model. The duration of the additional colorimetric processing by the RGB model is thus limited.

The invention also relates to a facility for manufacturing glass fibers, hollow glass or flat glass comprising at least one glass furnace and forming stations, in which cullet is poured into the glass furnace to obtain molten glass intended to supply the forming stations, said facility comprising a system for automated detection as described above, said automated detected system being positioned on the path of the cullet toward the glass furnace.

The invention also relates to a method for implementing said automated system for colorimetrically detecting materials of the glass-ceramic type among a cullet, characterized in that it comprises the following steps:
  a step of simultaneous lighting by at least one source of white light and at least one monochromatic ultraviolet light source of a cullet,
  a step of acquiring light rays reflected by an image acquisition device,
  a step of colorimetric processing by a colorimetric image processing module of the image obtained by the image acquisition device making it possible to identify the glass-ceramic material among other types of glass.

According to one feature of the invention, the colorimetric processing is carried out by determining a single datum per pixel or group of pixels of the analyzed image, then by comparison with a range of data.

The precision of the processing may vary depending on the need and/or the size of the cullet. Image processing can therefore be performed for each pixel of the image captured by the image acquisition device in order to ensure better precision.

A pixel is the basic unit used to define the quality of a digital image. In other words, it corresponds to a precise point of the image. The number of pixels of the image acquisition device depends on the resolution of the image acquisition device chosen to be integrated into the detection system.

The processing can also be done by group of pixels in order to process a set of pixels with less precision, but a faster processing speed. The use of one or the other of the analysis modes depends on factors such as the size of the cullet fragments, the number of fragments, or the risk of stacking the fragments on top of each other in the cullet deposited on the reflective surface.

According to one feature of the invention, the colorimetric processing is colorimetric processing according to an HSV model and is thresholded around an HSV hue datum H of between 50° and 70° with S=1 and V=0.5.

The colorimetric processing according to an HSV model makes it possible to identify fragments of cullet as glass-ceramic fragments. After the light sources are actuated to direct their radiation onto the surface of the cullet, the light reflected by the image acquisition device is captured and this same image undergoes colorimetric processing by an HSV model, the processed image is analyzed and fragments of the cullet may or may not appear to be a certain color. Indeed, depending on the lighting conditions of the detection system, the glass-ceramic fragments appear of a certain color on the image captured and processed according to an HSV model, which differentiates them from the rest of the cullet. Theoretically, the glass-ceramic material exhibits a color specific to itself during the use of the detection system on a cullet.

The thresholding of the colorimetric processing is based on the color reflected by the glass-ceramic when exposed to the rays emitted simultaneously by the two types of light sources. Due to the presence of metal oxides in its composition, glass-ceramic material absorbs some of the ultraviolet rays that it receives. These metal oxides absorb ultraviolet rays and corresponding crystals scatter blue light; this is why glass-ceramic material is in theory the only type of glass that appears yellow when a cullet is analyzed by the detection system, hence the choice of this threshold. After colorimetric processing, the calculation module can thus be configured to identify any pixel or group of pixels whose hue H is between 50° and 70° as glass-ceramic material.

According to one feature of the invention, the representations obtained by the image acquisition device of the fragments of cullet identified as being fragments of glass-ceramic material by the colorimetric processing according to an HSV model are rechecked by calculating the ratio of blue color to red color after a second colorimetric processing by the colorimetric image processing module according to an RGB model of these same fragment representations.

In other words, after analysis of the image by the image processing device according to an HSV model thresholded around a datum H, only the glass-ceramic material is theoretically revealed with a color close to the threshold datum. Image processing according to an HSV model can, however, lead to the formation of false positives during image processing. False positives can appear when the color of the glass closely resembles the color of the threshold datum used during processing by the HSV model or can be due to the presence of dust from certain types of glass on the fragments. These false positives are not glass-ceramic materials; they can be used to manufacture glass-based products and would therefore be eliminated from the cullet unnecessarily. To improve detection accuracy and identify these false positives, the HSV data of the pixels or the groups of pixels revealed to match the digital representation of glass-ceramic fragments are converted to RGB data. This second image processing is intended to eliminate false positives.

According to a variant embodiment, the additional image processing by colorimetry based on an RGB model can be carried out independently of the image processing by colorimetry based on the HSV model. In this variant, the processing based on an RGB model would be carried out on the image acquired by the image acquisition device, not previously processed.

Once all of the pixels or the groups of pixels identified as potentially corresponding to glass-ceramic material have been converted into RGB data, a ratio $$\frac{B}{R}$$

is calculated for each of these converted data. Hereinafter, the ratio $$\frac{B}{R}$$

corresponds to a ratio between the values of the blue and red components found in the images taken or in the fragments of the cullet revealed as being fragments of glass-ceramic material. The ratio between the blue and red components therefore distinguishes between glass-ceramic material and false positives. The calculation of this ratio therefore ensures that all false positives are eliminated and that only the fragments detected as corresponding to the glass-ceramic material are retained.

According to one feature of the invention, the fragments of cullet identified as being fragments of glass-ceramic material by the colorimetric processing according to an HSV model are confirmed as being fragments of glass-ceramic material if the calculation of the ratio of blue color to red color is greater than 0.5 after colorimetric processing according to an RGB model.

Glass-ceramic material is the only glass among those that can be detected as positive by HSV image processing that has a ratio $$\frac{B}{R}$$

greater than 0.5. However, the other glasses that are commonly considered as false positives, such as glass fragments used for wine or champagne bottles, have a ratio $$\frac{B}{R}$$

between 0.07 and 0.23. Conventional-type glass has a ratio $$\frac{B}{R}$$

of 1, but this type of glass cannot be detected as glass-ceramic material during image processing according to an HSV model.

BRIEF DESCRIPTION OF THE DRAWINGS

Other features and advantages of the invention will appear both from the description which follows and from several exemplary embodiments, which are given for illustrative purposes and without limitation with reference to the appended schematic drawings, in which:

FIG. 1 is a schematic representation of the detection system according to one embodiment of the invention.

DETAILED DESCRIPTION

Figure 1:
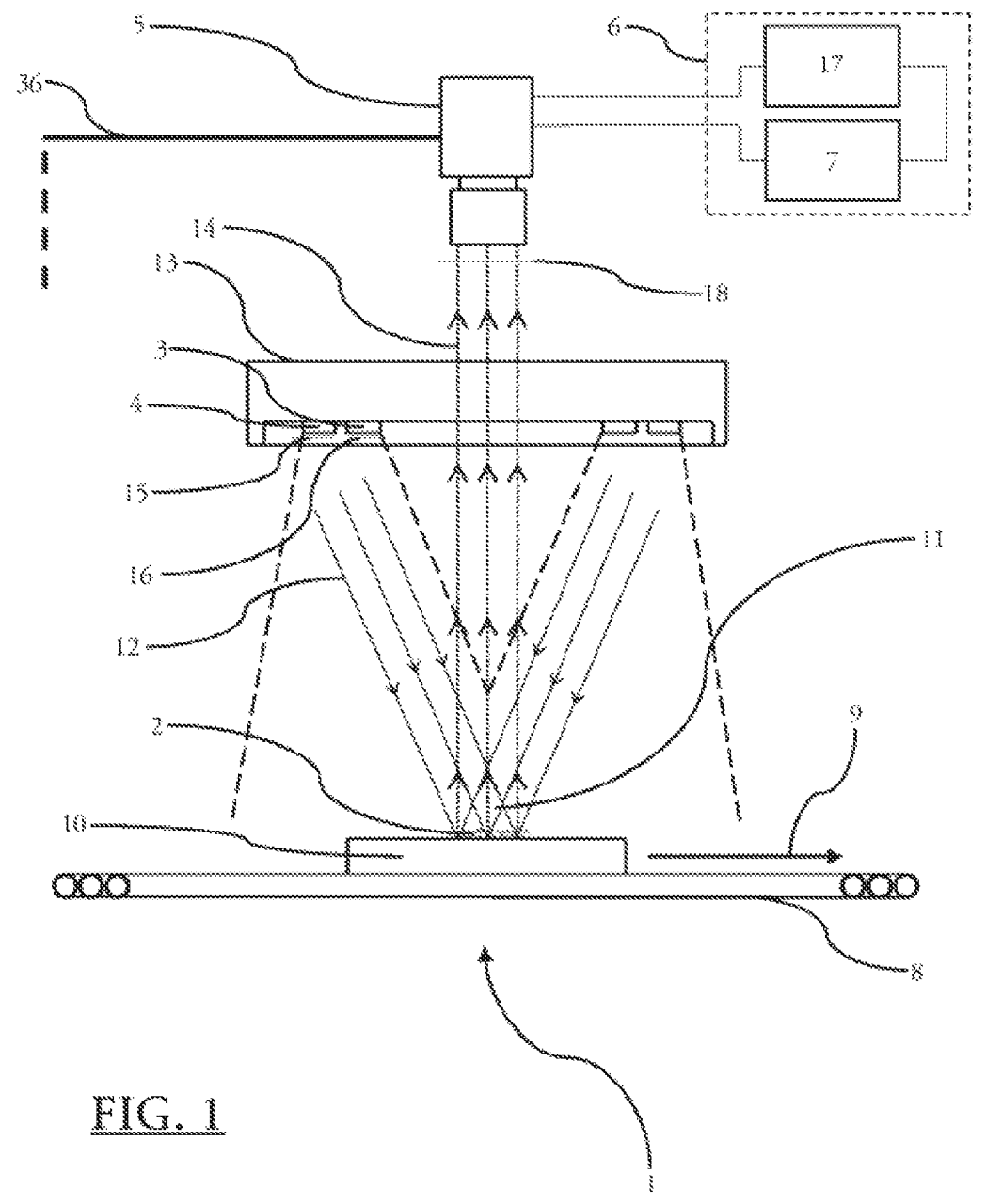
Figure 2:
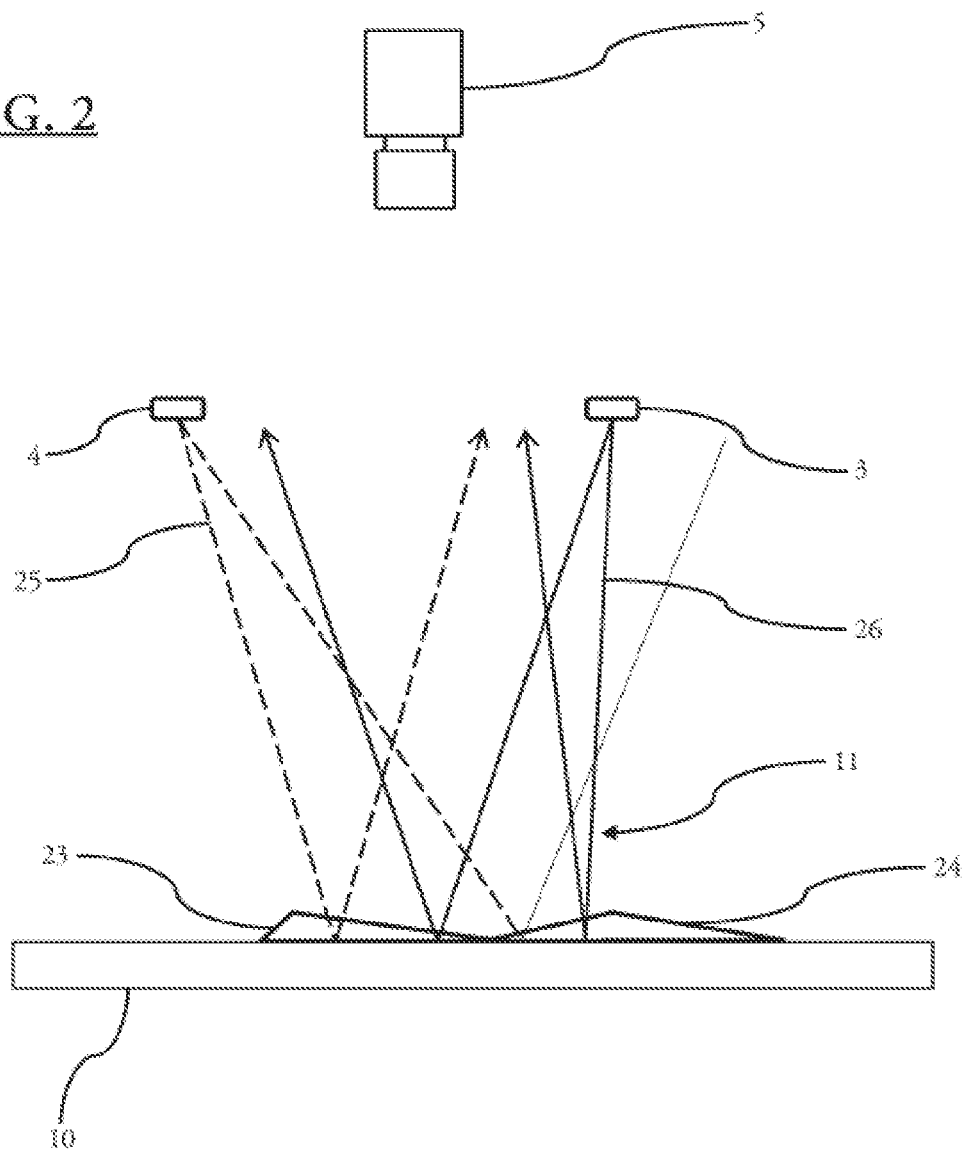
FIG. 2 is a schematic representation of the behavior of the radiation of the light sources of the system on a fragment of common glass and on a fragment of glass-ceramic material.

FIG. 1 represents a detection system 1 according to the invention. This system 1 comprises two types of light sources, including a first type corresponding to a white light source 3 and a second type corresponding to a monochromatic ultraviolet light source 4. The white light source(s) 3 and the monochromatic ultraviolet light source(s) 4 are attached to a structure 13 that supports the light sources and comprises means for supplying electrical energy. An image acquisition device 5 overhangs the structure 13. In the illustrated example, the image acquisition device 5 is supported by an attachment means 36, but it can also be directly integrated within the structure 13.

The light rays emitted by the white light source 3 are filtered directly by a polarizer 16, in order to limit the light intensity and to avoid spurious reflections, which can be processed subsequently. The rays emitted by the monochromatic ultraviolet-type source 4 are in turn filtered by a band-pass filter 15 centered at 365 nm in order to obtain purely monochromatic ultraviolet radiation. In the illustrated example, the arrangement of the light sources and the filters is identical on the other side of the structure 13 in order to have uniform overall lighting.

The white light source 3 and the monochromatic ultraviolet light source 4 emit light rays 12 in the direction of an emission region 11. The emission region 11 coincides with the capture plane of the image acquisition device 5. The light rays 12 emitted by the white light source 3 and the monochromatic ultraviolet light source 4 are projected onto a reflective surface 10, where a cullet 2 is placed.

In the illustrated example, the reflective surface 10 is arranged on a conveyor 8 moving in a direction 9. The light rays emitted by the white light source 3 and by the monochromatic ultraviolet light source 4 have a variable behavior when they reach the emission region where the cullet 2 is placed, as shown in FIG. 2.

Light rays 14 are reflected by the surface 10 in the direction of the image acquisition device 5. These light rays 14 are filtered by an analyzer 18, crossed with the polarizer 16. The association of the polarizer 16 and the analyzer 18 is intended to limit the spurious reflections coming from the light rays emitted by the white light source 3, which would make the processing of the image difficult to interpret. The image acquisition device 5 captures an image of the cullet 2 owing to the light rays 14 reflected by the reflective surface 10.

Once the image has been acquired, it is processed by an image processing device 6 electronically connected to the image acquisition device 5. The image processing device 6 comprises a colorimetric image processing module according to an HSV model 17, which is configured to analyze the image pixel by pixel or by sets of pixels and to convert these pixels into HSV data. The colorimetric image processing module according to an HSV model 17 is configured such that for each pixel or sets of pixels, a hue datum H is determined for fixed saturation S and value V data. These fixed data here are equal to S=1 and V=0.5.

Each determined hue datum H is then compared with at least one threshold datum. In the example, the hue datum H is compared with a minimum threshold of 50° and a maximum threshold of 70°. In other words, if a pixel or a set of pixels has HSV data equal to 50° 1-170°, S=1 and V=0.5, this pixel or set of pixels is identified as being part of a fragment of glass-ceramic material. This information is communicated either to a user of the system so that he can manually intervene and remove the glass-ceramic fragment from the cullet, or to an automated device allowing the identified glass-ceramic fragments to be ejected in a targeted manner.

Alternatively, additional colorimetric processing can be implemented. The HSV data of the fragments revealed to be glass-ceramic fragments by the HSV model colorimetric image processing module 17 are then converted into RGB data by means of an RGB model colorimetric image processing module 7, comprised in the image processing device 6, which calculates the ratio of blue color to red color $$\frac{B}{R}$$

of the recovered RGB data in order to detect potential false positives resulting from the processing carried out by the HSV model colorimetric image processing module 17 and to improve the precision of the detection system 1. According to the embodiment, the RGB model colorimetric processing module 7 can also convert the entire image acquired by the image acquisition device 5. The image is then directly transmitted to the RGB model colorimetric processing module 7.

FIG. 2 is a schematic representation of the light radiation from light sources on two different types of glass. For schematic simplification reasons, only two rays from each light source are shown, but in reality the light sources emit in a multitude of directions, for example at an emission angle of 90°. Furthermore, the refraction phenomena of the light rays on the glass fragments are not shown, again for the sake of simplifying the figure.

FIG. 2 shows the white light source 3 and the monochromatic ultraviolet light source 4 each emitting their respective light radiation. The white light source 3 emits white light rays 26, shown in solid lines, and the monochromatic ultraviolet light source 4 emits ultraviolet rays 25 with a wavelength of 365 nm, shown in dotted lines. The two light rays meet at the emission region 11, where here there is a cullet placed on the reflective surface 10. A conventional glass fragment 23 and a glass-ceramic fragment 24 here are present within the cullet.

The conventional glass fragment 23 allows all types of light rays to pass through. Thus, the white light ray 26 and the ultraviolet ray 25 pass through the structure of the conventional glass fragment 23, are reflected by the reflective surface 10 and pass through the structure of the conventional glass fragment 23 again toward the image acquisition device 5.

The glass-ceramic fragment 24 exhibits different optical properties from the conventional glass fragment 23. The glass-ceramic material has the particularity of absorbing a majority of ultraviolet rays, as will be explained in more detail with reference to FIG. 4. The ultraviolet ray 25 therefore does not pass through the structure of the glass-ceramic fragment 24 in its entirety and is absorbed for the most part. In general, an ultraviolet ray with a wavelength of 365 nm is hardly reflected in the direction of the image acquisition device 5 if its trajectory passes through a fragment of glass-ceramic material. Just like for the conventional glass fragment 23, the ray of white light 26 passes through the glass-ceramic fragment 24 and is reflected in the direction of the image acquisition device 5.

Theoretically, the image acquisition device 5 receives all the white light rays 26 coming from the white light source 3 and the ultraviolet rays 25 from the monochromatic ultraviolet light source 4 with the exception of the ultraviolet rays 25 having been largely absorbed by the glass-ceramic fragment(s) 24. This double lighting and the partial cut-off of the ultraviolet rays by the glass-ceramic material results in a possible colorimetric analysis on the acquired image because the glass-ceramic material takes on a yellow hue, unlike the rest of the cullet.

Figure 3:
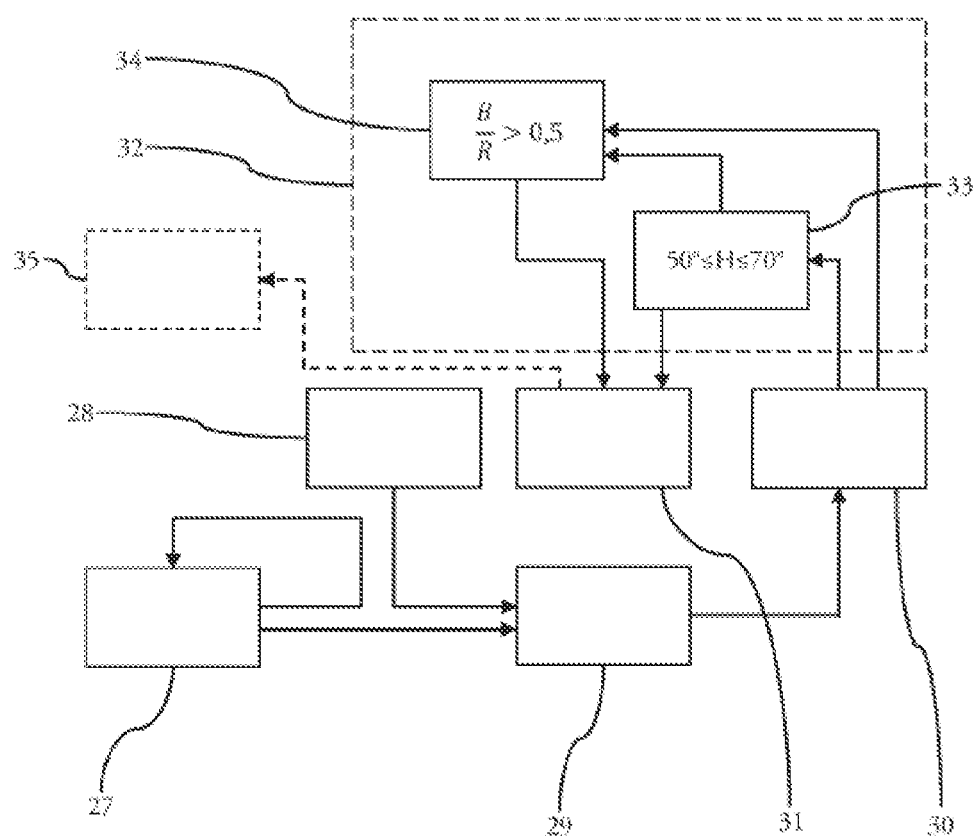
FIG. 3 is a schematic representation of the method of implementing the detection system.

FIG. 3 is a schematic representation of the method of implementing the detection system.

A step of scrolling of the conveyor 27 at a given speed involves a movement of one or more cullets on their reflective surface or directly on the reflective mat of the conveyor.

The scrolling of the conveyor 27 generates a step 29 of positioning the cullet in the emission region. At the same time, a step 28 of emitting the light radiation from the light sources is triggered in order to illuminate the cullet present at the emission region. The association of the step 29 of positioning the cullet in the emission region and the step 28 of emitting the light radiation from the light sources leads to a step of acquiring the image 30 by the image acquisition device.

Once the image has been captured, the latter is subjected to a step of processing the image 32, which in turn consists of at least one sub-step of colorimetric processing of the image according to an HSV model 33. The sub-step for colorimetric processing of the image according to an HSV model 33 analyzes the image obtained during the step of acquiring the image 30, pixel by pixel or by groups of pixels, by applying a thresholding to this image of H between the values 50° and 70°, so that 50° 1-170°, for defined data S and V. If no pixel or group of pixels corresponds to this threshold, the method for implementing the detection system ends, and a new cycle resumes with a new cullet scrolling on the conveyor.

If one or more pixels, or one or more groups of pixels, correspond to this thresholding of H, then the fragments of the cullet relative to these pixels or groups of pixels are theoretically identified as glass-ceramic fragments. Consequently, either the information is transmitted to a cullet monitoring calculation step 31 that will be described later, or a false positive check is carried out, via a colorimetric processing sub-step of the image according to an RGB model 34. To do this, several phases follow one another: first the acquired image is processed according to an RGB model; this may be either the image in its entirety, or only the pixels corresponding to the thresholding of the datum H of the HSV model. For each of these pixels, the red value R and the blue value B are recovered, the two values being between 0 and 255. The colorimetric image processing module according to an RGB model then calculates a ratio $$\frac{B}{R}$$

and compares this ratio to a threshold value. The threshold of $$\frac{B}{R}$$

is set to be greater than 0.5. In other words, if the ratio $$\frac{B}{R}$$

of one or more pixels or of one or more groups of pixels is greater than this threshold value of 0.5, then the corresponding fragment is confirmed as being a glass-ceramic fragment. If this same ratio is less than the threshold value of 0.5, then the corresponding fragment is identified as being a false positive, which is not a glass-ceramic fragment.

All of this information is then transmitted to the tracking calculation step 31. During the tracking calculation step 31, the fragments of interest are targeted, that is to say, the fragments that were identified as being glass-ceramic fragments, following the sub-step of colorimetric processing of the image according to an HSV model 33, and which were confirmed as such during the sub-step of colorimetric processing of the image according to an RGB model 34 if the latter is present in the system. These fragments are targeted and tracked by taking into account the movement speed of the cullet as a function of the speed of the conveyor. It is understood that the fragments are targeted in that, from a known position at time t, the system can precisely determine their position at time t+Δt.

Once these fragments are targeted during the tracking calculation step 31, a step then follows of eliminating the glass-ceramic fragments 35, in dotted lines in the FIG. 25 because they are external to the detection system. The step of eliminating the glass-ceramic fragments 35 can be carried out by means of a blower device, present along the conveyor, downstream of the detection system. Owing to the tracking calculation step 31, the blower device, having received the location information from the calculation module, is activated at the location where the glass-ceramic fragments are located, and at the right time. The glass-ceramic fragments are then expelled from the cullet.

Figure 4:
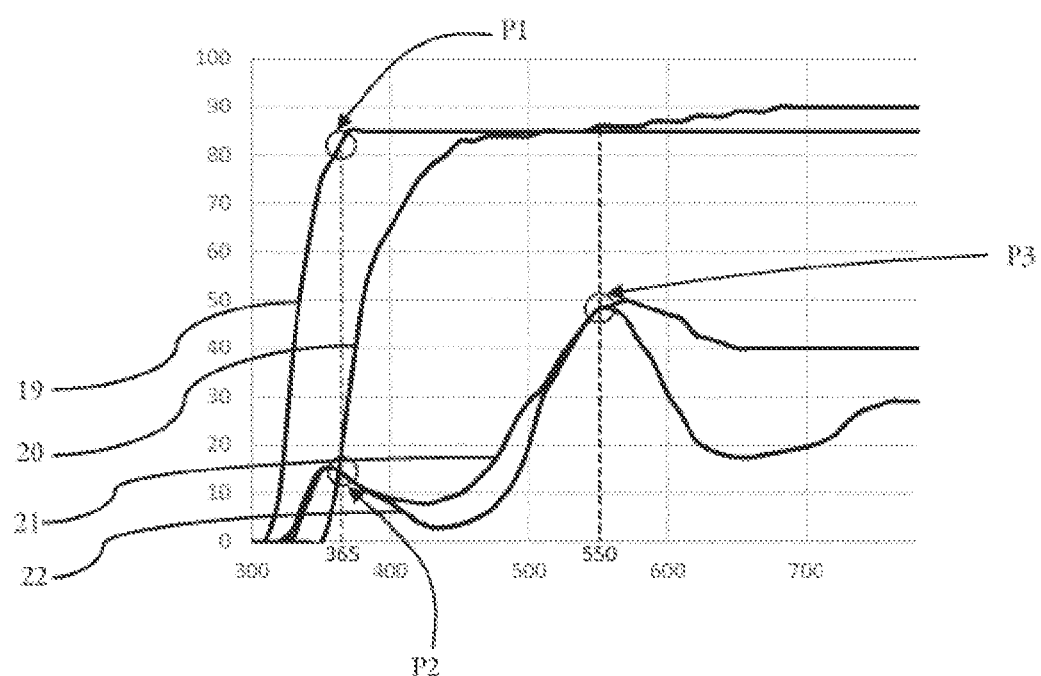
FIG. 4 is a graph showing the percentage of light transmission of different types of glass as a function of the wavelength of the received light.

FIG. 4 is a graph showing the percentage of light transmission through different types of glass as a function of the wavelength of the emitted light. Four curves corresponding to four different types of glass appear on this graph: a curve 19 corresponding to conventional glass, i.e. the most common glass, a curve 20 corresponding to glass-ceramic material, a curve 21 corresponding to bottle glass, commonly used to make wine bottles, and a curve 22 corresponding to champagne glass, commonly used to make champagne bottles. Concerning the abscissa axis of the graph, the region less than 400 nm corresponds to the ultraviolet domain, while the region greater than 400 nm corresponds to the visible domain.

The conventional glass curve 19 and the glass-ceramic material curve 20 have a similar appearance, namely a curve corresponding to a strong increase in the percentage of light transmission until reaching a level of between 85 and 90% transmission. The major difference between these two curves lies in the fact that the conventional glass curve 19 increases sharply at a shorter wavelength than the abrupt increase in the glass-ceramic material curve 20. Conventional glass therefore has a much higher transmission percentage than that of glass-ceramic material in ultraviolet rays. This difference justifies the use of a monochromatic ultraviolet light source with a wavelength of 365 nm, because at this value, the percentage of light transmission of conventional glass is more than 80% (point P1 in FIG. 4), while that of the glass-ceramic material is less than 20% (point P2 in FIG. 4). The image acquisition device therefore captures ultraviolet rays of 365 nm and white light rays of the entire visible spectrum, for example 550 nm, if they have passed through a fragment of conventional glass, but does not capture all of the ultraviolet rays that have encountered a glass-ceramic fragment, since these were largely absorbed by the glass-ceramic material. The lighting conditions of the detection system are such that the glass-ceramic material, through its optical properties, appears with a hue tinged with yellow, corresponding to the selected HSV threshold data, i.e. 50° 1-170°. The shade of color corresponding to the glass-ceramic material is due to several factors, in particular the light sources or the type of image acquisition device.

This yellow color is explained by the presence of metal oxides in the composition of the glass-ceramic material, as previously explained.

The other two curves, namely the bottle glass curve 21 and the champagne glass curve 22, also have a similar appearance with respect to one another. These are two types of glass whose respective curves are variable, and which transmit light waves with difficulty, never exceeding 50% light transmission (point P3 in FIG. 4). In terms of ultraviolet light, bottle glass and champagne glass have a percentage of light transmission similar to the percentage of light transmission of glass-ceramic material, in particular at 365 nm, which corresponds to the emission wavelength of the monochromatic ultraviolet light source. The bottle glass and the champagne glass therefore absorb the ultraviolet rays emitted by the monochromatic ultraviolet light source in the same way as the glass-ceramic material. Furthermore, the value of the wavelength where the two types of glass best transmit light is approximately 550-570 nm. In the visible spectrum, this wavelength range corresponds to a yellowish-green color.

To summarize, bottle glass and champagne glass have substantially the same UV absorption properties as glass-ceramic material, and their best percentage of light transmission corresponds to the yellowish-green color, which is a hue quite similar to the thresholding hue of the glass-ceramic material when the image obtained by the image acquisition device is processed by the colorimetric image processing module according to an HSV model. The bottle glass and the champagne glass are therefore two types of glass liable to be false positives, that is to say, they are liable to be detected as being fragments of glass-ceramic materials, when they are not, during analysis by the colorimetric image processing module according to an HSV model. The benefits of the presence of the RGB model colorimetric image processing module then become fully apparent, given that the ratio $$\frac{B}{R}$$

of the bottle glass and the champagne glass is less than 0.5, which makes it possible to deny that they are fragments of glass-ceramic material.

It will be understood on reading the foregoing that the present invention provides an automated system for detecting glass-ceramic material in a cullet. The invention cannot be limited to the means and configurations described and illustrated here, and it also extends to any equivalent means or configuration and to any technical combination using such means. In particular, while one embodiment is described in which the lighting conditions involve a yellow coloration of the glass-ceramic material, provision may be made for the threshold values implemented in the calculation module associated with the colorimetric processing module to differ from those described so as to detect a color other than yellow, since in accordance with the invention, only one datum from the HSV model is compared with a range of values to allow rapid detection as described that is capable of being implemented on a manufacturing line.

According to the invention, the data of the HSV model that is taken into account is compared with threshold values that depend on the lighting conditions, and that may also depend on the quality of the image acquisition means. Thus, depending on the quality of the camera used, the color identified for the glass-ceramic material may tend toward green, for example, while it is yellow to the naked eye, in accordance with what has been described above. Camera calibration may be required to adjust the HSV model threshold values. It should be understood that according to the invention, under suitable lighting such as a broad spectrum white light source and a source of ultraviolet radiation with a wavelength targeted at 365 nm, the glass-ceramic material reacts by taking on a hue special to it, in particular yellow, and which makes it possible, by means of the image acquisition means and of the colorimetric processing module, to detect this glass-ceramic material among other glass samples.

The invention claimed is:

1. An automated detection system for detecting materials of a glass-ceramic type among a cullet, comprising at least one white light source and at least one monochromatic ultraviolet light source, each being oriented to emit in a same emission region, an image acquisition device configured to acquire an image of said emission region and an image processing device configured to process each of the images acquired by the image acquisition device, the image processing device comprising a colorimetric image processing module configured to provide detection of glass-ceramic materials among other types of glass.

2. The automated detection system according to claim 1, wherein the colorimetric image processing module processes the images obtained by the image acquisition device by considering only one datum of a three-data colorimetric processing model.

3. The automated detection system according to claim 2, wherein the colorimetric image processing module comprises an HSV (Hue Saturation Value) model and processes the images obtained by the image acquisition device only by considering the hue data H of the HSV model.

4. The automated detection system according to claim 1, wherein the emission region comprises a cullet arranged on a reflective surface, illuminated by the at least one white light source and at least one monochromatic ultraviolet light source simultaneously, the light rays of which are picked up by the image acquisition device arranged on a same side of the reflective surface as the at least one white and at least one monochromatic ultraviolet light sources.

5. The automated detection system according to claim 1, wherein the radiation from the at least one monochromatic ultraviolet light source passes through a band-pass filter centered at 365 nm.

6. The automated detection system according to claim 1, wherein the light waves emitted by at least the at least one white light source are processed by a crossed polarizer and analyzer device before being picked up by the image acquisition device.

7. The automated detection system according to claim 1, further comprising a conveyor intended to make the cullet pass through the emission region of the light sources.

8. The automated detection system according to claim 1, further comprising a calculation module configured to determine a position of the various fragments of the cullet during its movement, the calculation module being configured to record the position of the fragments of the cullet detected as being fragments of glass-ceramic material at each instant t at the emission region, and to estimate their position downstream at an instant t+Δt by taking into account the movement speed of the cullet on the conveyor.

9. The automated detection system according to claim 1, wherein the image processing device further comprises a colorimetric image processing module according to an RGB model, said colorimetric image processing module according to an RGB model being configured to check results of the colorimetric image processing module configured to provide detection of glass-ceramic materials among other types of glass.

10. A facility for manufacturing glass fibers, hollow glass or flat glass comprising at least one glass furnace and forming stations, in which cullet is poured into the glass furnace to obtain molten glass intended to supply the forming stations, said facility comprising a system for automated detection according to claim 1, said automated detected system being positioned on a path of the cullet toward the at least one glass furnace.

11. A method for implementing an automated detection system for colorimetrically detecting materials of the glass-ceramic type among a cullet according to claim 1, comprising:
- a step of simultaneous lighting a cullet by at least one source of white light and at least one monochromatic ultraviolet light source,
- a step of acquiring light rays reflected by an image acquisition device,
- a step of colorimetric processing by a colorimetric image processing module of the image obtained by the image acquisition device making it possible to identify a glass-ceramic material among other types of glass.

12. The method according to claim 11, wherein the colorimetric processing is carried out by determining a single datum per pixel or group of pixels of the analyzed image, then by comparison with a range of data.

13. The method according to claim 11, wherein the colorimetric processing is colorimetric processing according to an HSV (Hue Saturation Value) model and is thresholded around an HSV datum of H of between 50° and 70° with S=1 and V=0.5.

14. The method according to claim 11, wherein representations obtained by the image acquisition device of the fragments of cullet identified as being fragments of glass-ceramic material by the colorimetric processing according to an HSV (Hue Saturation Value) model are rechecked by calculating the ratio of blue color to red color after a second colorimetric processing by the colorimetric image processing module according to an RGB model of these same fragment representations.

15. The method according to claim 14, wherein the fragments of cullet identified as being fragments of glass-ceramic material by the colorimetric processing according to the HSV model are confirmed as being fragments of glass-ceramic material if a calculation of a ratio of blue color to red color is greater than 0.5 after colorimetric processing according to the RGB model.

* * * * *